US009454692B2

(12) United States Patent
Zhang et al.

(10) Patent No.: US 9,454,692 B2
(45) Date of Patent: Sep. 27, 2016

(54) METHOD FOR IDENTIFYING AND POSITIONING BUILDING USING OUTLINE REGION RESTRAINT OF MOUNTAIN

(71) Applicant: Huazhong University of Science and Technology, Wuhan (CN)

(72) Inventors: Tianxu Zhang, Wuhan (CN); Li Zhang, Wuhan (CN); Fan Peng, Wuhan (CN); Heng Yao, Wuhan (CN); Cen Lu, Wuhan (CN); Yayun Zheng, Wuhan (CN); Yaxun Wei, Wuhan (CN); Cong Xiao, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 0 days.

(21) Appl. No.: 14/714,232

(22) Filed: May 15, 2015

(65) Prior Publication Data
US 2015/0248579 A1     Sep. 3, 2015

Related U.S. Application Data

(63) Continuation-in-part of application No. PCT/CN2014/085715, filed on Sep. 2, 2014.

(30) Foreign Application Priority Data

Dec. 24, 2013  (CN) .................. 2013 1 0722416 A

(51) Int. Cl.
*G06K 9/34*      (2006.01)
*G06K 9/00*      (2006.01)
(Continued)

(52) U.S. Cl.
CPC ......... *G06K 9/00201* (2013.01); *G06K 9/0063* (2013.01); *G06K 9/00208* (2013.01);
(Continued)

(58) Field of Classification Search
None
See application file for complete search history.

(56) References Cited

U.S. PATENT DOCUMENTS

| 5,892,554 A * | 4/1999 | DiCicco ............... H04N 5/2723 348/584 |
| 8,803,970 B2 * | 8/2014 | Weisensale .......... F24F 11/0086 348/143 |

(Continued)

FOREIGN PATENT DOCUMENTS

CN       101114337     *   1/2008

OTHER PUBLICATIONS

Kaneda et al, Three Dimensional Terrain Modeling and Display for Environmental Assessment, Computer Graphics, vol. 23, No. 3, Jul. 1989.*

(Continued)

*Primary Examiner* — Andrae S Allison
(74) *Attorney, Agent, or Firm* — Matthias Scholl, PC; Matthias Scholl

(57) ABSTRACT

A method for identifying and positioning a building using mountain-based outline region restraint, including steps of: (1) obtaining a real-time image, detecting a mountain-based outline of the real-time image, and extending the mountain-based outline thereby obtaining a mountain-based outline restraint region, (2) conducting morphological enhancement and background suppression on the image in the mountain-based outline restraint region, (3) conducting recursive segmentation in the mountain-based outline restraint region thereby transforming an image obtained in step (2) into a binary image, (4) extracting local regions of interest of a target building in the mountain-based outline restraint region according to the binary image, and (5) directly identifying and positioning the target building in the local regions of interest.

6 Claims, 5 Drawing Sheets

(51) Int. Cl.
*G06T 7/00* (2006.01)
*G06K 9/32* (2006.01)
*G06T 7/60* (2006.01)
*G06K 9/40* (2006.01)
*G06K 9/62* (2006.01)

(52) U.S. Cl.
CPC ....... *G06K9/00637* (2013.01); *G06K 9/00697* (2013.01); *G06K 9/3241* (2013.01); *G06K 9/40* (2013.01); *G06K 9/6222* (2013.01); *G06T 7/0042* (2013.01); *G06T 7/0083* (2013.01); *G06T 7/0085* (2013.01); *G06T 7/0091* (2013.01); *G06T 7/602* (2013.01); *G06T 2207/10004* (2013.01); *G06T 2207/10032* (2013.01); *G06T 2207/20036* (2013.01); *G06T 2207/30181* (2013.01); *G06T 2207/30184* (2013.01); *G06T 2207/30212* (2013.01)

(56) References Cited

U.S. PATENT DOCUMENTS

2005/0002570 A1\* 1/2005 Clark .................. G06K 9/4609
 382/199
2009/0089018 A1\* 4/2009 Kelley ................... G06T 17/05
 703/1

OTHER PUBLICATIONS

Yang et al, Method Building Recognition from FLIR Images, IEEE A&E Systems Magazine, May 2011.\*

\* cited by examiner

METHOD FOR IDENTIFYING AND POSITIONING BUILDING USING OUTLINE REGION RESTRAINT OF MOUNTAIN

CROSS-REFERENCE TO RELATED APPLICATIONS

This application is a continuation-in-part of International Patent Application No. PCT/CN2014/085715 with an international filing date of Sep. 2, 2014, designating the United States, now pending, and further claims priority benefits to Chinese Patent Application No. 201310722416.x filed Dec. 24, 2013. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

1. Field of the invention

The invention relates to the technical field of automatic identification of an imaging target, and more particularly to a method for identifying and positioning a building using mountain-based outline region restraint.

2. Description of the Related Art

Buildings in mountain areas are important parts of artificial buildings. For an infrared image having complex rolling hills as background, real-time detection and positioning of building targets is a key technique in navigation, and accurate positioning and identification thereof can meet requirement of unmanned aerial vehicles and manned aerial vehicles for applications such as accurate and automatic navigation, aircraft collision avoidance, and so on in the mountain areas.

If it is required that an aerial vehicle fly according to a predetermined route, a basic premise is that a route plan has to be made during flight preparation on the ground. However, errors in inertia navigation and positioning of the aerial vehicle may lead to route deviation in flying, and further direction deviation of an optical axis of an airborne imaging sensor. Therefore, a target image may not be located at the center of a view field, and may be to the left or right of the center, or above or below the center, which causes angular deviation between an actual target position and an estimated navigation position. Due to the existence of the deviation, it may be extremely difficult to guide the aerial vehicle to a predetermined target position by using an inertia navigation device only.

To correct the navigation deviation, it is possible to adopt forward-looking target identification of an optical sensor. However, conventional forward-looking target identification methods correct deviation between an actual flight route and a planned route by directly recognizing a target, which makes identification and positioning of a building impossible or unreliable in a case that optical imaging features of a target building is not salient (for example, the target building is hidden or shielded, the number of similar patterns of buildings is comparatively large, and local contrast of the building in optical imaging is poor). As the aerial vehicle approaches a building on a mountain from far away, since the building is in the vicinity of a mountain-based outline, false alarm may occur due to similar buildings on the same mountain, and full image searching may cause overhead of the method to be very high during direct identification of the building.

SUMMARY OF THE INVENTION

In view of the above-mentioned problems, it is an objective of the invention to provide a method for identifying and positioning a building using mountain-based outline region restraint that is capable of addressing problems of slow positioning, a low accuracy, and a high false alarm rate as optical imaging features of a target building in a mountain-based outline restraint region are not salient in a condition of a moving platform and a long distance. Fast positioning, a high accuracy, and a low false alarm rate provide a key technique of capturing and positioning a building during forward-looking navigation of an aerial vehicle.

To achieve the above objective, in accordance with one embodiment of the invention, there is provided a method for identifying and positioning a building using mountain-based outline region restraint, comprising steps of: (1) obtaining a real-time image, detecting a mountain-based outline of the real-time image, and extending the mountain-based outline thereby obtaining a mountain-based outline restraint region, (2) conducting morphological enhancement and background suppression on the image in the mountain-based outline restraint region, (3) conducting recursive segmentation in the mountain-based outline restraint region thereby transforming an image obtained in step (2) into a binary image, (4) extracting local regions of interest of a target building in the mountain-based outline restraint region according to the binary image, and (5) directly identifying and positioning the target building in the local regions of interest.

Preferably, step (1) further comprises sub-steps of: (1-1) obtaining the real-time image, and conducting binary segmentation thereon via a maximum variance between clusters method, (1-2) processing the binary-segmented image via a morphological dilation and erosion scheme after conducting medium filtering thereon, (1-3) processing an image obtained in step (1-2) via edge detection thereby obtaining the mountain-based outline, and (1-4) forming a region as the mountain-based outline restraint region by moving the mountain-based outline up and down by $\Delta$ pixels, where $\Delta$ is $1/20 \sim 1/10$ of a height of a current frame of the image.

Preferably, in step (1-2), a dilation and erosion operator is:

|   | 1 |   |
|---|---|---|
| 1 | 1 | 1 |
|   | 1 |   |

Preferably, step (2) further comprises sub-steps of: (2-1) morphological enhancement: conducting gray-based morphological close operation on the real-time image in the mountain-based outline restraint region using a structuring element with a height-width ratio of 1×7, thereby reducing internal texture information in the target building and enhancing image contrast, and (2-2) morphological background suppression: conducting gray-based morphological open operation on the real-time image in the mountain-based outline restraint region after morphological enhancement using a morphological structuring element of a target building that is prepared.

Preferably, the recursive segmentation in step (3) comprises: conducting gray-level statistics on the real-time image in said mountain-based outline restraint region after the morphological background suppression, and sequentially conducting gray-level recursive segmentation on gray levels in a descending order as segmentation thresholds, thereby forming binary images, the times of the recursive segmentation being 5.

Preferably, step (4) further comprises sub-steps of:

(4-1) extracting the local regions of interest, comprising:

(4-1-1) calculating geometric features of the target building in a two-dimensional imaging plane of an imager according to a height and a width of the target building in a real scene and an inertia navigation parameter, and (4-1-2) labeling white regions in the binary image obtained in step (3) in said mountain-based outline restraint region, and calculating feature parameters of all labeled regions, the feature parameters comprising area, centroid, perimeter, a height, a width, and a form factor;

(4-2) verifying the local regions of interest, comprising:

(4-2-1) detecting a linear feature: detecting the image via a vertical line template and a horizontal line template thereby obtaining a horizontal gradient map and a vertical gradient map respectively, and (4-2-2) verifying the linear feature: verifying an local original image of the regions of interest via vertical lines in the mountain-based outline restraint region, comprising verifying all obtained regions of interest via vertical lines using a vertical length threshold being half of an imaging height of the target building, and keeping regions of interest passing verification, then verifying the local original image of the regions of interest via horizontal lines, comprising verifying all obtained regions of interest via horizontal lines using a horizontal length threshold being half of an imaging width of the target building, and keeping regions of interest passing verification, and outputting no detection result if none of the regions of interest passes the verification.

Preferably, step (5) comprises: matching features of the regions of interest passing the verification with reference features of the target building, extracting local contrast features and vertical linear features of the regions of interest, collecting the number of vertical lines each having a vertical length 0.8 times greater than the imaging height of the target building, and the number of horizontal lines each having a horizontal length 0.8 times greater than the imaging width of the target building, and using a region of interest with the greatest local contrast as a final matching result.

To summarize, the method of the invention has the following advantages over the prior art:

1. since step (1), in which the mountain-based outline restraint region is extracted, and identification and positioning of the building therein is conducted, is used, a problem of false alarm caused by too many identical patterns existing in full image searching is solved, and accuracy is improved, meanwhile, the method only needs to handle images in the mountain-based outline restraint region, which reduces overhead and operation time thereof, and ensures real-time performance.

2. since step (4), in which the local regions of interest are extracted, and target identification and positioning are conducted in the regions, is used, a restraint region is gradually reduced by recursive processes in time sequences in steps (1) to (4), time required for recognizing the building is reduced, and a positioning accuracy is improved.

DETAILED DESCRIPTION OF THE EMBODIMENTS

For clear understanding of the objectives, features and advantages of the invention, detailed description of the invention will be given below in conjunction with accompanying drawings and specific embodiments. It should be noted that the embodiments are only meant to explain the invention, and not to limit the scope of the invention. Furthermore, the technical features involved as described in the embodiments in the invention could be inter-combination if only there is no confliction between each other.

Buildings in the vicinity of a mountaintop are very common in many regions, as seen from a long distance, a demarcation line that is not very obvious appears between a mountain and the sky, the buildings near the mountaintop seem to be in the vicinity of a mountain-based outline, and the mountain-based outline forms an important feature around the target building. Core content of the invention is to facilitate detection and positioning of the building using a space restraint relationship between the mountain-based outline and the target building.

The method for identifying and positioning a building in a mountain area measures data via a sensor on an aerial vehicle, prepares a multi-viewpoint and multi-scale-target structuring element according to a three-dimensional reference model of a target building, estimates a model feature of the target building under parameters of the sensor according to the structuring element, preprocesses a real-time image by mathematical morphology thereby filtering background having different size and shape from a target building, conducts iterative segmentation on the preprocessed image, conducts region-of-interest feature extraction on the image after iterative segmentation, matches the extracted feature with the model feature, keeps a region of interest that is most similar to the model feature, and conducting linear feature verification and local contrast verification via the region of interest mapped into a region of an original image thereby identifying and positioning the target.

Figure 1:
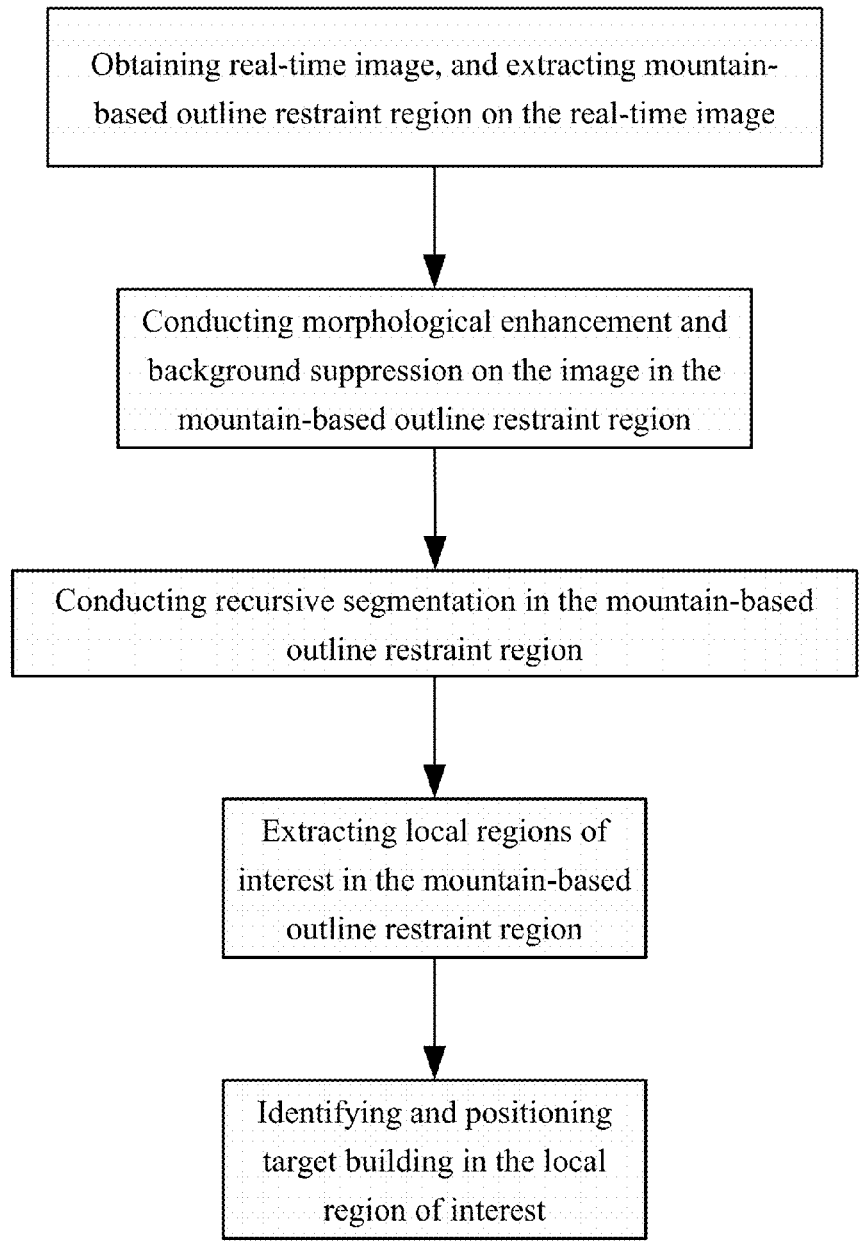
FIG. 1 illustrates a flow chart of a method for identifying and positioning a building using mountain-based outline region restraint of one embodiment of the invention.
Figure 2:
FIG. 2 illustrates a first frame of a real-time image.
Figure 3:
FIG. 3 illustrates segmentation results of the real-time image.

As shown in FIG. 1, a method for identifying and positioning a building using mountain-based outline region restraint of the invention comprises steps of:

(1) obtaining a real-time image, detecting a mountain-based outline of the real-time image, and extending the mountain-based outline thereby obtaining a mountain-based outline restraint region. This step further comprises sub-steps of:

(1-1) obtaining a first frame of the real-time image (as shown in FIG. 2), and conducting binary segmentation thereon via a maximum variance between clusters method (OTSU). Segmented results are shown in FIG. 3.

(1-2) conducting medium filtering on a binary image after segmentation thereby eliminating noise caused by segmentation, and processing the binary-segmented image via a morphological dilation and erosion scheme thereby eliminating edge aliasing in the mountain-based region. The dilation and erosion operator is as follows:

|   |   |   |
|---|---|---|
|   | 1 |   |
| 1 | 1 | 1 |
|   | 1 |   |

Figure 4:
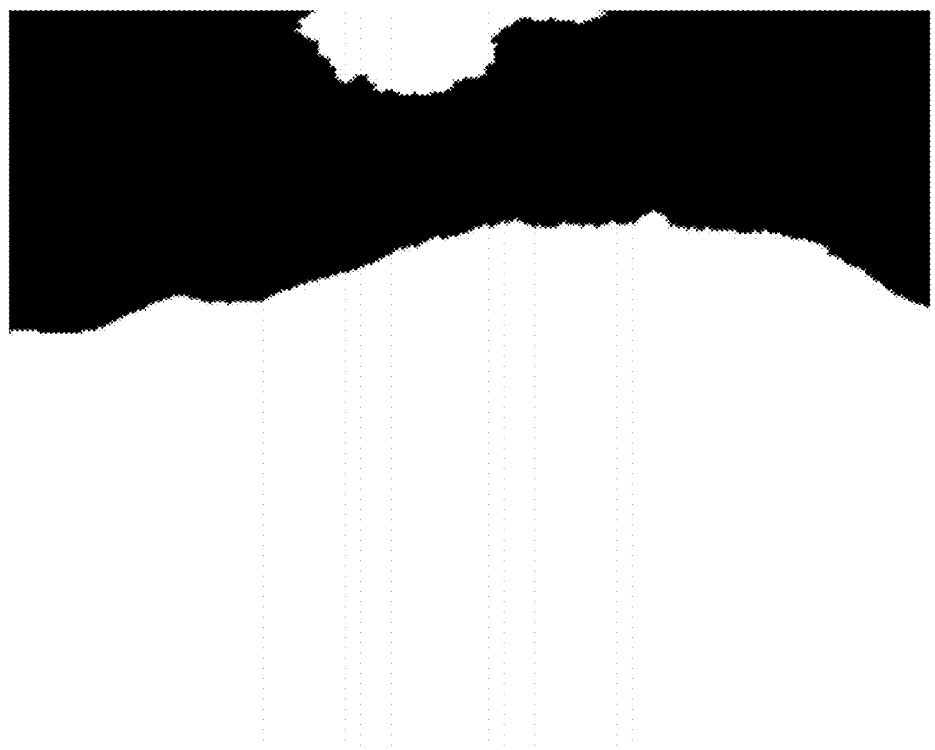
FIG. 4 illustrates results obtained by morphological dilation and erosion after medium filtering of FIG. 3.

Morphological dilation and erosion results are shown in FIG. 4.

Figure 5:
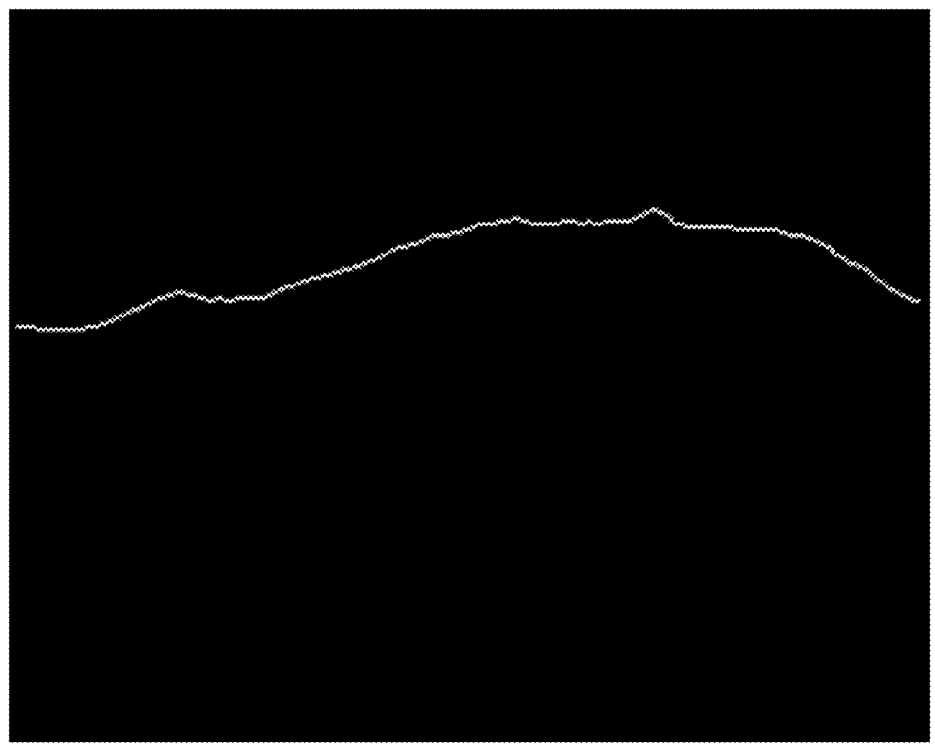
FIG. 5 illustrates extraction results of a mountain-based outline.

(1-3) processing an image obtained in step (1-2) via edge detection thereby obtaining a demarcation line between a mountain region and a sky region as the mountain-based outline, as shown in FIG. 5.

Figure 6:
FIG. 6 illustrates a mountain-based outline restraint region.

(1-4) forming a region as the mountain-based outline restraint region by moving the mountain-based outline up and down by Δ pixels, where Δ is 1/20~1/10 of a height of a current frame of the image. Extraction results of the mountain-based outline restraint region are shown in FIG. 6.

(2) conducting morphological enhancement and background suppression on the image in the mountain-based outline restraint region:

(2-1) morphological enhancement: conducting gray-based morphological close operation on the real-time image in the mountain-based outline restraint region using a structuring element with a height-width ratio of 1×7, thereby reducing internal texture information in the target building and enhancing image contrast.

(2-2) morphological background suppression: conducting gray-based morphological open operation on the real-time image in the mountain-based outline restraint region after morphological enhancement using a morphological structuring element of a target building that is prepared.

Specifically, at a flight altitude of 1000 m and an image distance of 7 km, the morphological structuring element prepared on the ground is shown as a 35 pixels (height)×25 pixels (width) dual-color semicircle region in the following Table 1,

TABLE 1

Figure 7:
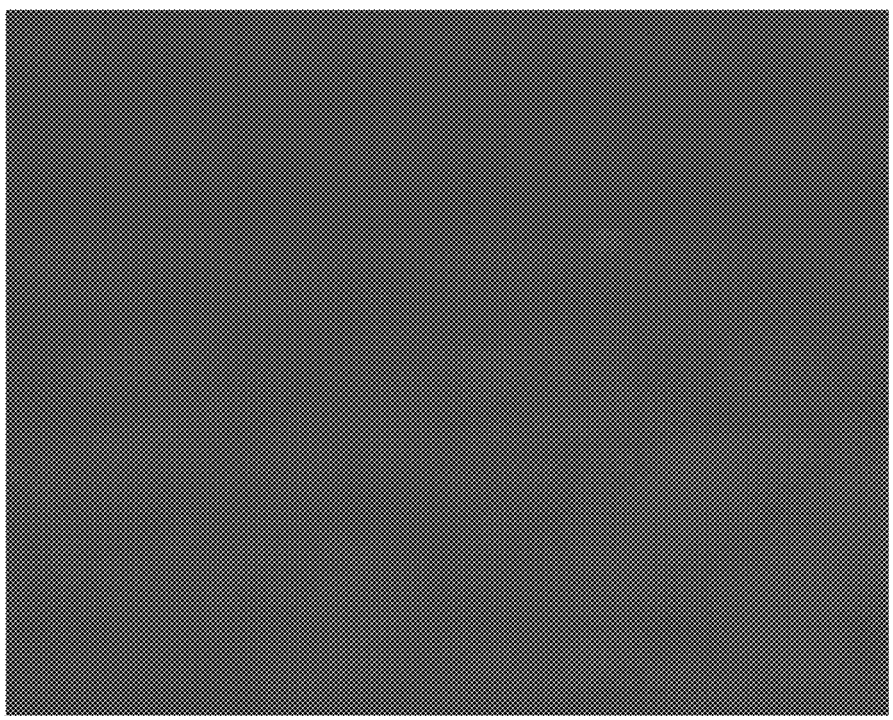
FIG. 7 illustrates results of morphological enhancement and background suppression of the real-time image in the mountain-based outline restraint region.

| morphological structuring element | | |
|---|---|---|
| ⌂ | ⌂ | ⌂ |
| (a) | (b) | (c) |
| ⌂ | ⌂ | ⌂ |
| (d) | (e) | (f) | where a distance of a morphological structuring element (a) is 2000 m, an elevation angle thereof is 16°, a distance of a morphological structuring element (b) is 3000 m, an elevation angle thereof is 16°, a distance of a morphological structuring element (c) is 4000 m, an elevation angle thereof is 16°, a distance of a morphological structuring element (d) is 5000 m, an elevation angle thereof is 14°, a distance of a morphological structuring element (e) is 6000 m, an elevation angle thereof is 12°, a distance of a morphological structuring element (f) is 7000 m, an elevation angle thereof is 14°. A white region represents a target, and a black region represents background. These structuring elements are multiplied by scaling factors $\epsilon_w$ and $\epsilon_h$, where $\epsilon_w$=0.8, $\epsilon_h$=0.4. These structuring elements are used for conducting gray-based morphological open operation on the real-time image in the mountain-based outline restraint region, so as to filter buildings and background having different shape and scale from a target building, and to reduce gray level of the image. Processing results are shown in FIG. 7.

(3) conducting recursive segmentation in the mountain-based outline restraint region thereby transforming an image obtained in step (2) into a binary image.

Figure 8:
FIG. 8 illustrates results obtained by conducting a first binary segmentation on FIG. 7.

The recursive segmentation comprises: conducting gray-level statistics on the image after the morphological enhancement and background suppression, and sequentially conducting gray-level recursive segmentation on gray levels in a descending order as segmentation thresholds, thereby forming binary images. To ensure target regions can be segmented, the times of the recursive segmentation is set to 4. Results obtained by conducting the first binary segmentation on FIG. 7 are shown in FIG. 8.

(4) extracting local regions of interest of a target building in the mountain-based outline restraint region according to the binary image obtained in step (3). This step comprises sub-steps of:

(4-1) extracting the local regions of interest, comprising:

(4-1-1) calculating a reference feature of a target building, namely calculating geometric features, comprising an imaging height $H_t^m$, a width $W_t^m$, a perimeter $C_t$, an area $S_t$ and a form factor $F_t$, of the target building in a two-dimensional imaging plane of an imager according to a height $H_t^b$ and a width $W_t^b$ of the target building in a real scene and inertia navigation parameters (a flight altitude H, a field angle Φ×φ, an entrance angle γ, an azimuth angle α, an elevation angle θ). Calculation equations are as follows:

$$Dist = \tan(\theta \times 3.1415926/180) \times H$$

$$H_t^m = 2 \times a\tan((H_t^b/2.0/Dist) \times 180/3.1415926) \times ROW/\phi$$

$$W_t^m = 2 \times a\tan((W_t^b/2.0/Dist) \times 180/3.1415926) \times COL/\varphi$$

$$S_t = H_t^m \times W_t^m, \ c_t = 2 \times H_t^m \times W_t^m, \ F_t = \frac{C_t^2}{4\pi S_t}$$

where Dist represents a distance between the aerial vehicle and the target building.

In this embodiment, the height of the target building $H_t^b$=7 m, and the width thereof $W_t^b$=5 m, then the imaging height of the target building $H_t^m$=22, and the imaging width thereof $W_t^m$=18. Assuming both $\epsilon_h$ and $\epsilon_w$ are equal to 2, then the local regions of interest covering the target building can be obtained.

(4-1-2) calculating feature parameters of the regions of interest, namely: selecting a local region of interest, a position of a centroid thereof being $(X_t, Y_t)$h, a height thereof being ROI_H=$H_t^m \times \epsilon_h$, and a width thereof being ROI_W=$W_t^m \times \epsilon_w$, where $H_t^m$ and $W_t^m$ respectively represent an imaging height and an imaging width of a perspective target, 1.5≤$\epsilon_h$, $\epsilon_w$≤5. In this embodiment, assuming $\epsilon_h$=$\epsilon_w$=2, then ROI_H=$H_t^m$×2=44, and ROI_W=$W_t^m$×2=36.

In the mountain-based outline restraint region, labeling white regions in the binary image obtained in step (3), and calculating feature parameters of all labeled regions, the feature parameters comprising the area $S_{Oi}$, the centroid $(X_{Oi}, Y_{Oi})$, the perimeter $C_{Oi}$, the height $H_{Oi}^m$, the width $W_{Oi}^m$, and the form factors $F_{Oi}$, where i=1, 2, 3, . . . .

At a flight altitude of 1000 m, an entrance angle γ, and an imaging distance of 7 km, results obtained by morphological background suppression are shown in FIG. 7. After the first segmentation, only one region of interest is obtained, a height thereof $H_{O1}^m$=18, a width thereof $W_{O1}^m$=16, a perimeter thereof $C_{01}=64$, an area thereof $S_{01}=284$, a form factor thereof $F_{01}=1.11$ coordinate of a centroid thereof $(X_1, Y_1)=$ (84 pixels, 282 pixels).

(4-2) verifying the local region of interest, comprising:
(4-2-1) detecting a linear feature:
transforming an original local image in the local region of interest into a gradient map, namely detecting the image via a vertical line template and a horizontal line template thereby obtaining a horizontal gradient map and a vertical gradient map respectively.

The vertical line template is as follows:

| 1 | 2 | 1 |
|---|---|---|
| 1 | 2 | 1 |
| 1 | 2 | 1 |

The horizontal line template is as follows:

| 1 | −1 | 1 |
|---|----|---|
|   | 2  |   |
| 1 | −1 | 1 |

(4-2-2) verifying the linear feature:
verifying the local original image of the region of interest via vertical lines in the mountain-based outline restraint region, comprising verifying all obtained regions of interest via vertical lines using a vertical length threshold being half of the imaging height $H_t^m$ of the target building, and keeping regions of interest passing verification, then verifying the local original image of the region of interest via horizontal lines, comprising verifying all obtained regions of interest via horizontal lines using a horizontal length threshold being half of the imaging width $W_t^m$ of the target building, and keeping regions of interest passing verification, and outputting no detection result if none of the regions of interest passes the verification.

(5) directly identifying and positioning the target building in the local region of interest:
matching features of the regions of interest passing the verification with reference features of the target building, extracting local contrast features and vertical linear features of the regions of interest, collecting the number of vertical lines each having a vertical length 0.8 times greater than the imaging height of the target building $H_t^m$, and the number of horizontal lines each having a horizontal length 0.8 times greater than the imaging width of the target building $W_t^m$, and using a region of interest with the greatest local contrast as a final matching result.

Figure 9:
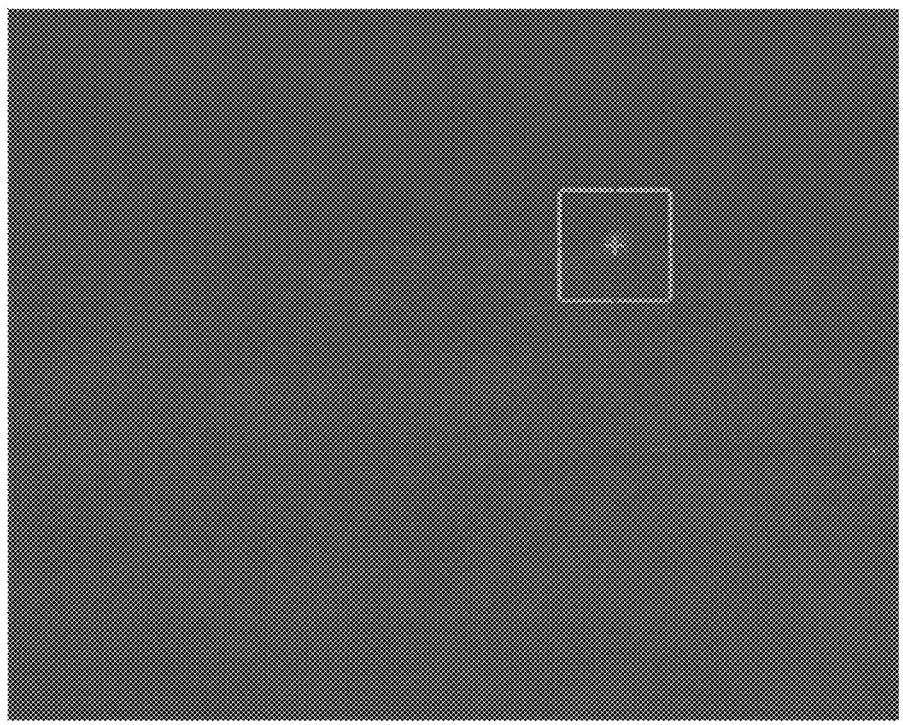
FIG. 9 illustrates identification and positioning results of the first frame of the real-time image.

Identification and positioning results of the first frame of the real-time image is shown in FIG. 9.

To summarize, the invention calculates the reference feature of the target building in advance, prepares the morphological structuring element of the target building, extracts the feature parameters using mathematical morphology filtering based on characteristics of buildings in mountain areas, and matches the feature parameters with the reference feature so as to identify and position forward-looking target buildings on the ground, taking texture and scene information of the target building into account. The invention has been successfully used for identifying and positioning forward-looking buildings on the ground that have complex background, features high identification accuracy and reliability, and can be applicable for identification of forward-looking buildings on the ground with different viewpoints, scales and heights.

While preferred embodiments of the invention have been described above, the invention is not limited to disclosure the embodiments and the accompanying drawings. Any changes or modifications without departing from the spirit of the invention fall within the scope of the invention.

The invention claimed is:

1. A method for identifying and positioning a building using a mountain-based outline region restraint, the method comprising the steps of:
    (1) obtaining a real-time image, detecting a mountain-based outline of said real-time image, and extending said mountain-based outline, wherein obtaining a mountain-based outline restraint region;
    (2) conducting morphological enhancement and background suppression on said image in said mountain-based outline restraint region;
    (3) conducting recursive segmentation in said mountain-based outline restraint region, wherein transforming an image obtained in step (2) into a binary image;
    (4) extracting local regions of interest of a target building in said mountain-based outline restraint region according to said binary image; and
    (5) directly identifying and positioning said target building in said local regions of interest;
wherein step (1) further comprises sub-steps of:
    (1-1) obtaining said real-time image, and conducting binary segmentation thereon via a maximum variance between clusters method;
    (1-2) processing said binary-segmented image via a morphological dilation and erosion scheme after conducting medium filtering thereon;
    (1-3) processing an image obtained in step (1-2) via edge detection thereby obtaining said mountain-based outline; and
    (1-4) forming a region as said mountain-based outline restraint region by moving said mountain-based outline up and down by Δ pixels, where Δ is 1/20-1/10 of a height of a current frame of said image.

2. The method of claim 1, wherein in step (1-2), a dilation and erosion operator is:

|   | 1  |   |
|---|----|---|
| 1 | 1  | 1 |
|   | 1. |   |

3. A method for identifying and positioning a building using a mountain-based outline region restraint, the method comprising the steps of:
    (1) obtaining a real-time image, detecting a mountain-based outline of said real-time image, and extending said mountain-based outline, wherein obtaining a mountain-based outline restraint region;
    (2) conducting morphological enhancement and background suppression on said image in said mountain-based outline restraint region;
    (3) conducting recursive segmentation in said mountain-based outline restraint region, wherein transforming an image obtained in step (2) into a binary image;
    (4) extracting local regions of interest of a target building in said mountain-based outline restraint region according to said binary image; and
    (5) directly identifying and positioning said target building in said local regions of interest;
wherein step (2) further comprises sub-steps of:
    (2-1) morphological enhancement: conducting gray-based morphological close operation on said real-time image in said mountain-based outline restraint region using a structuring element with a height-width ratio of 1×7, thereby reducing internal texture information in said target building and enhancing image contrast; and (2-2) morphological background suppression: conducting gray-based morphological open operation on said real-time image in said mountain-based outline restraint region after morphological enhancement using a morphological structuring element of a target building that is prepared.

4. A method for identifying and positioning a building using a mountain-based outline region restraint, the method comprising the steps of:

(1) obtaining a real-time image, detecting a mountain-based outline of said real-time image, and extending said mountain-based outline, wherein obtaining a mountain-based outline restraint region;

(2) conducting morphological enhancement and background suppression on said image in said mountain-based outline restraint region;

(3) conducting recursive segmentation in said mountain-based outline restraint region, wherein transforming an image obtained in step (2) into a binary image;

(4) extracting local regions of interest of a target building in said mountain-based outline restraint region according to said binary image; and (5) directly identifying and positioning said target building in said local regions of interest;

wherein:

the recursive segmentation in step (3) comprises: conducting gray-level statistics on said real-time image in said mountain-based outline restraint region after the morphological background suppression, and sequentially conducting gray-level recursive segmentation on gray levels in a descending order as segmentation thresholds, thereby forming binary images, the times of the recursive segmentation being 5.

5. A method for identifying and positioning a building using a mountain-based outline region restraint, the method comprising the steps of:

(1) obtaining a real-time image, detecting a mountain-based outline of said real-time image, and extending said mountain-based outline, wherein obtaining a mountain-based outline restraint region;

(2) conducting morphological enhancement and background suppression on said image in said mountain-based outline restraint region;

(3) conducting recursive segmentation in said mountain-based outline restraint region, wherein transforming an image obtained in step (2) into a binary image;

(4) extracting local regions of interest of a target building in said mountain-based outline restraint region according to said binary image; and (5) directly identifying and positioning said target building in said local regions of interest;

wherein step (4) further comprises sub-steps of:

(4-1) extracting said local regions of interest, comprising:

(4-1-1) calculating geometric features of said target building in a two-dimensional imaging plane of an imager according to a height and a width of said target building in a real scene and an inertia navigation parameter;

(4-1-2) labeling white regions in said binary image obtained in step (3) in said mountain-based outline restraint region, and calculating feature parameters of all labeled regions, said feature parameters comprising area, centroid, perimeter, a height, a width, and a form factor; and (4-2) verifying said local regions of interest, comprising:

(4-2-1) detecting a linear feature: detecting said image via a vertical line template and a horizontal line template thereby obtaining a horizontal gradient map and a vertical gradient map respectively; and (4-2-2) verifying said linear feature: verifying an local original image of regions of interest via vertical lines in said mountain-based outline restraint region, comprising verifying all obtained regions of interest via vertical lines using a vertical length threshold being half of an imaging height of said target building, and keeping said regions of interest passing verification, then verifying said local original image of said regions of interest via horizontal lines, comprising verifying all obtained regions of interest via horizontal lines using a horizontal length threshold being half of an imaging width of said target building, and keeping said regions of interest passing verification, and outputting no detection result if none of said regions of interest passes the verification.

6. A method for identifying and positioning a building using a mountain-based outline region restraint, the method comprising the steps of:

(1) obtaining a real-time image, detecting a mountain-based outline of said real-time image, and extending said mountain-based outline, wherein obtaining a mountain-based outline restraint region;

(2) conducting morphological enhancement and background suppression on said image in said mountain-based outline restraint region;

(3) conducting recursive segmentation in said mountain-based outline restraint region, wherein transforming an image obtained in step (2) into a binary image;

(4) extracting local regions of interest of a target building in said mountain-based outline restraint region according to said binary image; and (5) directly identifying and positioning said target building in said local regions of interest;

wherein:

step (5) comprises: matching features of said regions of interest passing the verification with reference features of said target building, extracting local contrast features and vertical linear features of said regions of interest, collecting the number of vertical lines each having a vertical length 0.8 times greater than said imaging height of said target building, and the number of horizontal lines each having a horizontal length 0.8 times greater than said imaging width of said target building, and using a region of interest with the greatest local contrast as a final matching result.

* * * * *